United States Patent
Ash et al.

(10) Patent No.: US 9,677,347 B2
(45) Date of Patent: Jun. 13, 2017

(54) SHOCK ABSORBER, RELATED METHODS AND APPARATUSES

(71) Applicant: Reeves Wireline Technologies Limited, Leicestershire (GB)

(72) Inventors: Simon Christopher Ash, Nottingham (GB); Neill Gilhooley, Nottingham (GB); Neil John Banton, Nottinghamshire (GB)

(73) Assignee: Reeves Wireline Technologies Limited, Leicestershire (GB)

(*) Notice: Subject to any disclaimer, the term of this patent is extended or adjusted under 35 U.S.C. 154(b) by 514 days.

(21) Appl. No.: 14/249,041

(22) Filed: Apr. 9, 2014

(65) Prior Publication Data
US 2014/0305660 A1    Oct. 16, 2014

(30) Foreign Application Priority Data
Apr. 10, 2013   (GB) .................................. 1306513.1

(51) Int. Cl.
*E21B 17/07*  (2006.01)
*F16F 7/12*   (2006.01)
(Continued)

(52) U.S. Cl.
CPC ............ *E21B 17/07* (2013.01); *E21B 47/011* (2013.01); *F16F 1/3732* (2013.01); *F16F 7/12* (2013.01); *G01V 1/523* (2013.01)

(58) Field of Classification Search
CPC .......... E21B 17/07; E21B 23/14; E21B 47/01; E21B 47/011; F16F 1/40; F16F 1/406; F16F 7/12; F16F 7/121; F16F 7/122
See application file for complete search history.

(56) References Cited

U.S. PATENT DOCUMENTS 3,112,442 A    11/1963   Bennett
3,368,489 A *  2/1968    Herter ..................... F42B 7/08
                                              102/451
(Continued)

FOREIGN PATENT DOCUMENTS

CA        2866489 A1    9/2013
GB        2427421 A    12/2006
(Continued)

OTHER PUBLICATIONS

Search Report received in corresponding Great Britain application No. GB1306513.1, dated Apr. 8, 2014.
(Continued)

*Primary Examiner* — David Andrews
*Assistant Examiner* — Tara Schimpf
(74) *Attorney, Agent, or Firm* — Blank Rome LLP

(57) ABSTRACT

A shock absorber (29) for downhole use comprises an elongate, hollow member defined by a series of mutually aligned, plastically deformable perforated members (38) having aligned perforations that define the hollowness of the elongate, hollow member that are spaced from one another in the direction of elongation by respective relatively rigid spacer members (39) that are secured to the perforated members. The elements of each pair of perforated members (38) of the series are so spaced from one another by one or more of the spacer members (39) such that on compression of the shock absorber (29) the perforated members (38) deform plastically to a lesser extent in regions at which the spacer members (39) are secured than at other regions. The arrangement of the perforated members (38) and the spacer members (39) causes compression to occur substantially parallel to the length of the shock absorber (29).

35 Claims, 4 Drawing Sheets

(51) Int. Cl.
*E21B 47/01* (2012.01)
*G01V 1/52* (2006.01)
*F16F 1/373* (2006.01)

(56) References Cited

U.S. PATENT DOCUMENTS

| | | | |
|---|---|---|---|
| 4,428,443 | A | 1/1984 | Oliphant |
| RE32,336 | E * | 1/1987 | Escaron ................ E21B 17/003 |
| | | | 166/254.2 |
| 2003/0089497 | A1* | 5/2003 | George .................. E21B 17/07 |
| | | | 166/297 |
| 2010/0147530 | A1 | 6/2010 | Adamek |
| 2010/0243239 | A1 | 9/2010 | Furui |
| 2014/0210633 | A1* | 7/2014 | Hrametz ................ E21B 47/12 |
| | | | 340/854.4 |

FOREIGN PATENT DOCUMENTS

| | | |
|---|---|---|
| SU | 1247505 A1 | 7/1986 |
| WO | 2013059327 A1 | 4/2013 |

OTHER PUBLICATIONS

Search Report received in corresponding Great Britain application No. GB1306513.1, dated Sep. 19, 2013.
First Office Action received in corresponding Canadian Appl. 2,847,313, dated Nov. 21, 2016, 4-pgs.

* cited by examiner

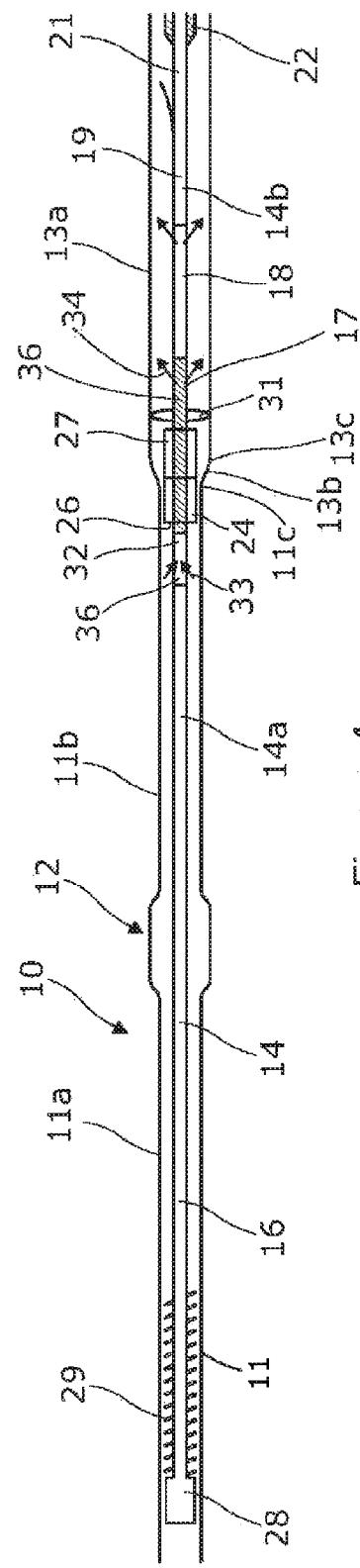
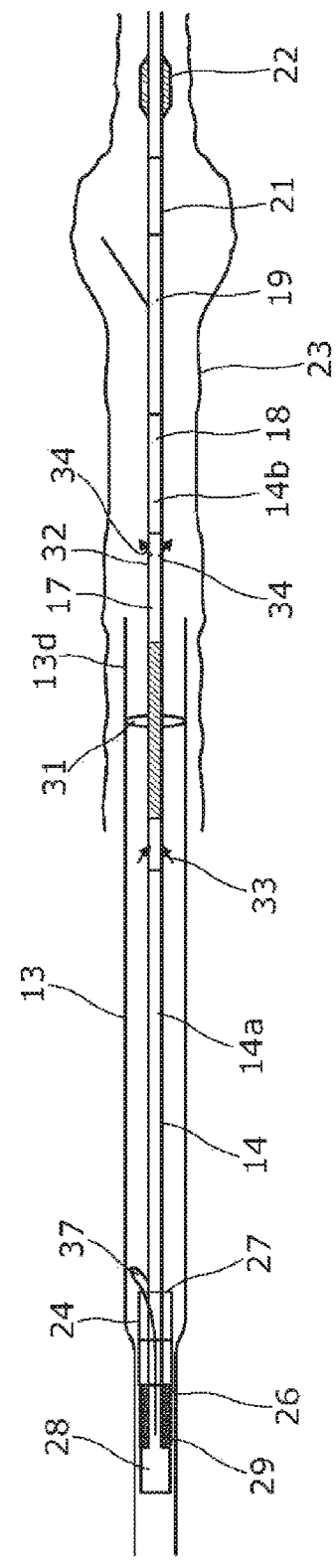
Figure 4
Figure 5

SHOCK ABSORBER, RELATED METHODS AND APPARATUSES

BACKGROUND

1. Field of the Disclosure

The invention relates generally to a shock absorber, to a logging assembly incorporating the shock absorber, and to methods of using the logging assembly.

2. Related Art

The logging of geological formations is, as is well known, economically a highly important activity. The invention is of benefit in logging activities potentially in all kinds of mining and especially in the logging of reserves of oil and gas, water or other valuable commodities.

Virtually all commodities used by mankind are either farmed on the one hand or are mined or otherwise extracted from the ground on the other, with the extraction of materials from the ground providing by far the greater proportion of the goods used by humans.

It is extremely important for an entity wishing to extract materials from beneath the ground to have as good an understanding as possible of the lithology of a region from which extraction is to take place.

This is desirable partly so that an assessment can be made of the quantity and quality, and hence the value, of the materials in question; and also because it is important to know whether the extraction of such materials is likely to be problematic.

In consequence a wide variety of logging methods has been developed over the years. The logging techniques exploit physical and chemical properties of a formation usually through the use of a logging tool or sonde that is lowered into a borehole (that typically is, but need not be, a wellbore) formed in the formation by drilling.

Typically the sonde sends energy into the formation and detects the energy returned to it that has been altered in some way by the formation. The nature of any such alteration is processed into electrical signals that are then used to generate logs (i.e. numerical, graphical or tabular representations containing much data about the formation in question).

The logging sondes usually are elongate, rigid cylinders that might be 2 m or more in length and between about 57 mm (2¼ inches) and 203 mm (8 inches) in diameter. A toolstring containing a sonde might be considerably longer, with toolstring lengths in the range 5-10 m being known.

A toolstring is normally conveyed from a surface location to a chosen location in a well or borehole, that typically but not necessarily is near its total depth (TD), by being supported on drillpipe that is fed into the well or borehole.

As is well known, drillpipe is elongate, hollow, hardened steel tubing that is provided in the form discrete so-called "stands" or "joints" of standard lengths (typically about 10 m or 30 feet each) that may be screwed one to another by way of so-called "pin" and "box" ends to create long tubes that might be hundreds or thousands of meters long.

Each stand of drillpipe includes at one, in use uphole, end a socket (box) that is threaded and at its in-use downhole end a threaded exterior section (pin) that can be threadedly received in the socket of an adjacent drillpipe stand.

Drillpipe can be used to support various kinds of logging tool or toolstring in order to permit their conveyance into a well or borehole. It is known in this regard to convey logging tools shielded inside the hollow interior of drillpipe while the latter is run in to the location, underground, at which logging is to take place. The logging toolstring may then be caused to move partially to protrude from the drillpipe so that logging may commence. The drillpipe is withdrawn at a chosen speed in an uphole direction (with successive stands being removed at the surface location as their connections to the adjacent drillpipe below become exposed) while logging of the formation takes place.

Data resulting from the logging process are in one way or another transmitted to a computer at a surface location (that may be at the wellhead, or at a location far removed from the oil or gas field under investigation) that through the use of installed software produces logs that typically but not necessarily are in a graphical form. Other software and/or skilled human analysts then can interpret the logs and from them obtain much valuable information about the subterranean conditions in the formation logged.

The internal circular diameter of most drillpipe in use is less than 100 mm (4 inches) yet several sondes or other elements of a logging toolstring extend in at least one transverse dimension over a greater width. As a consequence such elements cannot be conveyed downhole inside drillpipe because they are too large or too wide.

Such tool elements may need to be conveyed downhole in an unprotected manner. This exposes them to extremely harsh conditions caused by e.g. the pressure of fluids in a well, extremes of temperature, aggressive chemicals and impacts with rock or other equipment.

Aside from the fact that logging toolstring elements often are very valuable in themselves any damage to such elements may cause costly delays in oilfield exploration or completion, or may result in leakage of substances the handling of which is subject to strict regulation, or the release of large amounts of energy. For a variety of reasons therefore there is a need to improve the conveyance of (in particular) one or more logging toolstring elements each having a diameter, or at least one transversely extending dimension, that is too large to permit conveyance inside drillpipe.

Even if the logging toolstring does not contain any elements that are too wide to be conveyed inside drillpipe, and the whole toolstring may be accommodated inside drillpipe during running in, a need exists for improvements in the apparatuses and methods used at the time of deployment of logging sondes forming parts of toolstrings.

SUMMARY OF THE DISCLOSURE

According to the invention in a first aspect, there is provided a shock absorber for downhole use comprising an elongate, hollow member defined by a series of mutually aligned, plastically deformable perforated members having aligned perforations that define the hollowness of the elongate, hollow member that are spaced from one another in the direction of elongation by respective relatively rigid spacer members that are secured to the perforated members, the elements of each pair of perforated members of the series being so spaced from one another by one or more of the spacer members such that on compression of the shock absorber the perforated members deform plastically to a lesser extent in regions at which the spacer members are secured than at other regions, the arrangement of the perforated members and the spacer members causing compression to occur substantially parallel to the length of the shock absorber.

Such a shock absorber advantageously enables the construction of new designs of downhole assembly, as defined and described herein, together with new methods of deploying logging tools also as defined and described herein.

Preferably, the perforated members are mutually aligned annuli each of similar dimensions to one another whereby the elongate, hollow member defines a hollow, cylindrical shape.

Also preferably, the spacer members are spacer bars that extend parallel to the length of the shock absorber. The use of such bars advantageously provides rigidity and stiffness at particular parts of the shock absorber. As a result the plastic deformation of the shock absorber occurs in a controlled, predictable manner; and at other times (i.e. before plastic deformation occurs) the integrity of the shock absorber is assured.

Conveniently, the members of each pair of annuli of the series are spaced from one another by a pair of the spacer bars that are disposed diametrically opposite one another with reference to the circumferences of the annuli. This confers a regular pattern on the structure of the shock absorber. However, in other embodiments of the invention other regular or even irregular patterns of the elements of the shock absorber may be adopted.

Further, preferably each alternate pair of annuli of the series is so spaced from one another by a pair of the spacer bars that are disposed diametrically opposite one another with reference to the circumferences of the annuli and that are rotated by 90 degrees relative to the spacer bars of the adjacent pair of annuli. In an alternative arrangement, however optionally, the elements of at least one said pair of annuli of the series are spaced from one another by three or more of the spacer bars that are disposed at equally spaced intervals about a circumference defined by the annuli. Thus, various regular and irregular patterns may be accommodated.

A shock absorber as defined above can be manufactured relatively cheaply from e.g. mild steel and yet may be made adequately robust as to survive downhole environments until it is used to absorb an impact.

The plastic deformability of the annuli or other perforated members means that on use the appearance of the shock absorber changes permanently. It therefore is immediately obvious, from a visual inspection, whether a particular shock absorber according to the invention has previously been used or not.

As noted, preferably the annuli/other perforated member types are formed of or from a deformable metal, especially a steel; and further preferably the annuli/other perforated member types and the spacer bars are rigidly secured one to another. These features of the shock absorber assist in making it cheap and straightforward to manufacture. Since in view of its plastic deformability in use the shock absorber is intended to be a single-use component before it is discarded or recycled it is advantageous that the manufacturing cost is low.

According to the invention in a second aspect, there is provided a logging assembly comprising a length of drillpipe defining an in-use downhole part; and an elongate toolstring supported by the drillpipe and comprising a plurality of toolstring elements secured seriate one to another, the toolstring being moveable longitudinally relative to the drillpipe between a retracted position lying within the drillpipe and an extended position partly protruding therefrom beyond the downhole extent thereof, the logging assembly including inside the drillpipe a landing surface having formed therein or defining an aperture through which part of the toolstring moveably extends; and a shock absorber that is capable of acting between the toolstring and the landing surface to attenuate impact energy arising on movement of the toolstring to the extended position and that is engageable with the landing surface to limit movement of the toolstring through the aperture and thereby retain the toolstring moveably captive relative to the drillpipe.

Such an arrangement advantageously solves the problem of protecting wide or large-diameter logging toolstring elements, during conveyance, inside drillpipe; and also enables the construction of further inventive downhole assemblies, defined below, that accommodate toolstring elements of greater diameter or transverse dimension than the internal diameter of drillpipe.

The presence of the shock absorber in part makes this possible, since landing of the toolstring inside the drillpipe otherwise might cause impacts that damage either the toolstring itself or the conveyance system.

Preferably, the toolstring includes a protuberance that is secured to the toolstring and that is engageable by the shock absorber. Such a protuberance can be in the form of an enlarged cylinder that is secured at or near the in-use uphole end of the toolstring so as to increase its diameter such as to prevent its passage through the aperture. This arrangement allows longitudinal movement of the toolstring over the length of the toolstring between the protuberance and the relatively large toolstring element that is furthest uphole in use, while preventing the toolstring from becoming completely free of the drillpipe.

A protuberance of this kind, that is too large to pass through an aperture, is sometimes referred to in the logging and mineral production arts as a "no-go".

However, the protuberance does not itself need to be sufficiently large as to be incapable of passing through the aperture and therefore does not have to amount to a no-go. On the contrary in some embodiments of the invention, the protuberance may act as no more than an anchor for part of the shock absorber. In such an arrangement, and also in some embodiments of the invention in which the protuberance indeed is a no-go, conveniently the shock absorber is too large to pass through the aperture in or defined by the landing surface. In such cases the shock absorber, rather than the protuberance, provides a landing surface that engages the edge of the aperture on deployment of the elongate toolstring to the extended position.

In yet further embodiments of the invention, the landing action may involve contact of both the protuberance and the shock absorber with features defining or connected to the aperture.

In practice, the shock absorber preferably but not necessarily is a compressible element, as described further herein, that on compression dissipates impact or contact energy.

In preferred embodiments of the invention, the toolstring includes an elongate bar or tube of greater length than the shock absorber measured in the direction of elongation of the drillpipe, whereby to permit movement of the toolstring between the retracted and extended positions over a greater distance than the said length of the shock absorber before attenuation of impact energy occurs. This aspect of the invention gives rise to the possibility of the deployment movement of the elongate toolstring, from the retracted position to the extended position, involving two stages. These are, firstly, an undamped movement over part of the length of the elongate bar while the shock absorber is not being compressed; and secondly a damped movement phase following engagement of the shock absorber to cause its compression. The second movement phase occurs shortly before completion of the deployment movement.

Preferably, the shock absorber defines a hollow cylinder that encircles the elongate bar or tube; and also preferably, the logging toolstring assembly includes one or more spacer elements interposed between the hollow cylinder and the elongate toolstring.

These constructional arrangements advantageously ensure that the shock absorber is correctly aligned, and dissipates impact energy evenly around the circumference of the toolstring.

In another preferred aspect, the logging toolstring assembly of the invention includes a seal that seals between the exterior of the toolstring and the elongate pipe in order to prohibit fluid flow on the exterior of the toolstring in the vicinity of the seal.

Also preferably, the seal is fixed to the elongate toolstring and therefore moveable therewith.

When the logging assembly is so configured, preferably the toolstring includes a toolstring wall defining at least one internally hollow portion that communicates with the exterior of the toolstring by way of longitudinally spaced first and second fluid passages perforating the toolstring wall, the first and second fluid passages together with the internally hollow portion defining a fluid flow path that is capable of bypassing the seal.

In preferred embodiments of the second aspect of the invention, the shock absorber is in accordance with the first aspect of the invention defined herein. However, in other embodiments also within the scope of the invention, other shock absorber arrangements may be used.

Regardless of the shock absorber design adopted, conveniently at least one of the first and second fluid passages includes therein at least one valve that selectively blocks the flow of fluid via the internally hollow portion.

The effect of the flow passage and valve arrangement as defined is to provide a selectively closeable passage. When closed, this together with the remainder of the cross-section of the toolstring creates a reaction surface against which pressure of borehole fluid, that is circulated in the well for example by means of a per se known pumping, recirculation, filtering and reservoir pit arrangement, or by means of another pumping arrangement, acts to drive the elongate toolstring in a downhole direction from the retracted position to the extended one.

When on the other hand the valve is open, a flow bypass exists such that the well can be circulated without causing movement of the toolstring. Thus the arrangement of the invention provides a selectively operable drive arrangement for moving the toolstring to the extended position after conveyance to a logging location has taken place.

In preferred embodiments of the invention, the logging assembly includes a latch that is capable of acting between the toolstring and the drillpipe or the elongate pipe in order selectively releasably to retain the toolstring in the retracted position.

This feature beneficially ensures that the sonde(s) of the elongate toolstring remain deployed while the drillpipe is withdrawn so that logging can take place. Once the elongate toolstring is recovered to a surface location the latch can be released and re-set so that the assembly of the invention can be made ready for re-use, as necessary following replacement of the shock absorber.

In preferred embodiments of the invention, one or more of the toolstring elements is or includes a logging sonde.

It is also preferable that the logging assembly includes a length of elongate pipe of larger internal diameter than the drillpipe secured to the downhole part thereof and extending in a downhole direction beyond the drillpipe, and one or more relatively large said toolstring elements that are of greater external dimensions than the internal diameter of the drillpipe and that lie within the elongate pipe when the toolstring occupies the retracted position, the one or more relatively large toolstring elements protruding beyond the elongate pipe when the toolstring occupies the extended position.

The invention thus takes advantage of the relatively narrow internal dimensions of drillpipe to provide a moveably captive retention arrangement for the toolstring while also providing a larger diameter elongate pipe that can be used to shield toolstring parts as they are conveyed in a well or borehole.

More particularly, in preferred embodiments of the invention, at least one said relatively large toolstring element is or includes a said logging sonde.

Thus the invention caters for a commonly encountered problem that part of a sonde is too wide to fit inside drillpipe.

However, in other embodiments of the invention, a part of the toolstring other than a logging sonde may constitute a relatively large toolstring element.

Conveniently, the elongate toolstring includes a rotation lock that is capable of preventing rotation of the toolstring relative to the drillpipe and elongate pipe. The rotation lock may be of the reverse mule shoe type that prevents rotation of the toolstring relative to the drillpipe and elongate pipe, or it may be of another type. The terms "rotation lock" and "reverse mule shoe" have recognised meanings, in the downhole tool art, that the person of skill understands Preferably, the elongate pipe is or includes wash pipe. Wash pipe, the nature of which is known in the art, is normally attached to drillpipe to enable washover operations to take place but its dimensions and the ease with which it may be secured to the downhole end of a length of drillpipe beneficially make it well suited to inclusion in the assembly of the invention, without any need for the design of a new type of enlarged diameter elongate pipe for this purpose.

In a third aspect of the invention, there is provided a method of deploying a logging assembly according to the second aspect of the invention defined herein, the method including feeding the drillpipe in a downhole direction in a well or borehole with the toolstring in the retracted position; halting downhole movement of the logging toolstring assembly; and causing movement of the toolstring relative to the drillpipe to the extended position such that the shock absorber acts between the toolstring and the drillpipe to attenuate impact energy and such that part of the elongate toolstring protrudes beyond the drillpipe.

Conveniently, the logging assembly is as defined in claim 23 or claim 24 hereof, and the step of causing movement of one or more said relatively large toolstring elements causes them to protrude from the elongate pipe beyond the downhole extent thereof.

When at least one of the first and second fluid passages of the logging toolstring assembly includes therein a valve that selectively blocks the flow of fluid via the internally hollow portion, preferably the step of causing movement of the toolstring includes closing or maintaining closed the one or more valves in order to close the fluid flow path that is capable of bypassing the seal; and circulating the well or borehole with fluid the pressure of which acts on the toolstring to drive it in a downhole direction.

When the logging assembly includes a latch as aforesaid, preferably the method includes the step of latching the toolstring in the retracted position.

When the elongate toolstring includes a rotation lock as aforesaid, preferably the method of the invention includes the step of operating the rotation lock to prevent or limit rotation of the toolstring relative to the drillpipe and elongate pipe.

The method of the invention additionally preferably includes the steps of (a) withdrawing the logging assembly towards a surface location and, optionally, (b) operating at least one said logging sonde to log a formation during withdrawal of the logging assembly.

The method also optionally includes the step of compressing the shock absorber so as to cause plastic deformation of at least a part of it. This step normally would occur on deployment of the elongate toolstring assembly from the retracted to the extended position.

BRIEF DESCRIPTION OF THE DRAWINGS

There now follows a description of preferred embodiments of the invention, by way of non-limiting example, with reference being made to the accompanying representations in which:

FIG. 4 is a schematic, longitudinal cross-sectional view of a logging toolstring assembly according to the second and third aspects of the invention, including an elongate toolstring in a retracted position typically adopted during running-in of drillpipe in cased hole; and FIG. 5 is a view similar to FIG. 4 showing the elongate toolstring in an extended and latched position adopted when logging a formation in open hole.

DETAILED DESCRIPTION

Figure 1:
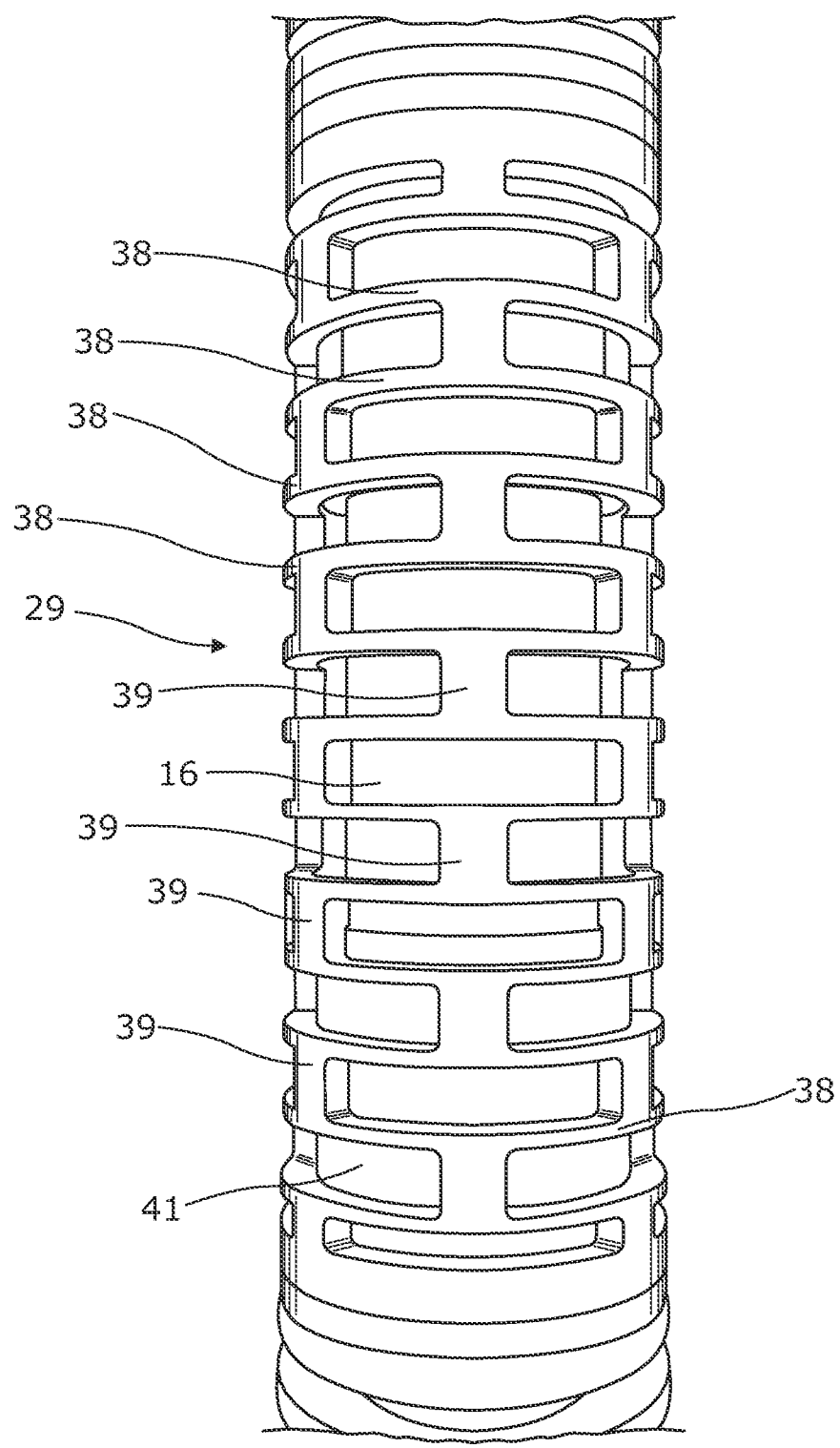
FIG. 1 shows an unused shock absorber element, according to the first and third aspects of the invention.
Figure 2:
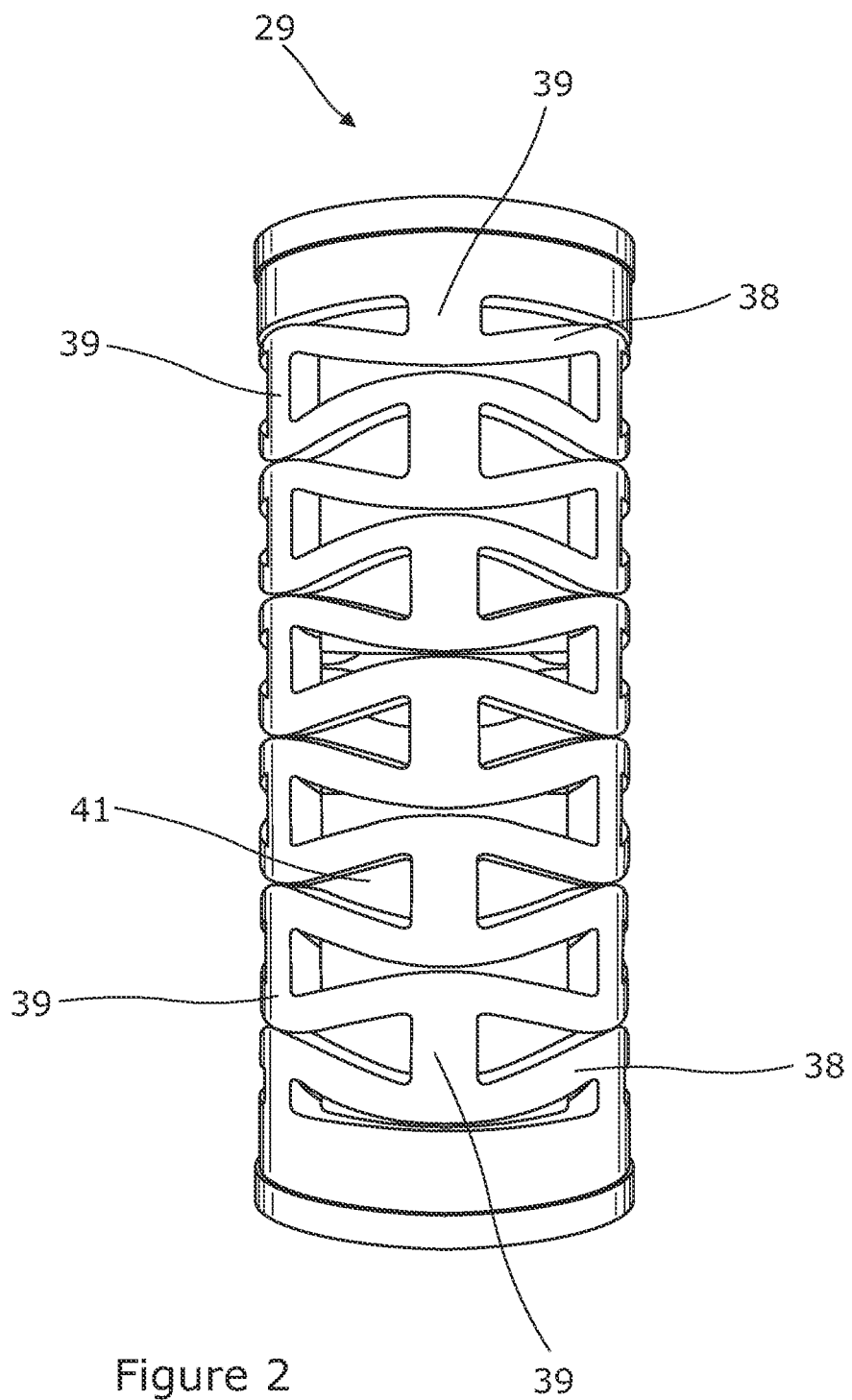
FIG. 2 shows a shock absorber such as that visible in FIG. 1 following plastic deformation that arises on use.

FIGS. 1 and 2 show in respectively the uncompressed and compressed states one preferred form of shock absorber 29 that is suitable to form part of the apparatus of the invention.

FIG. 1 shows that the shock absorber 29 comprises a series of mutually aligned, flat, circular annuli 38 that in the embodiment illustrated, but not necessarily, are of the same external diameter with the same diameter aperture formed in the centre.

The annuli 38 are spaced from one another so as to form a hollow cylinder-shaped boundary of the shock absorber 29 as illustrated. The annuli 38 are formed from a plastically deformable material that nonetheless is tough and capable of resisting harsh downhole conditions. A mild steel is an example of a suitable material from which to manufacture the annuli 38.

There are fifteen of the annuli 38 in the exemplary shock absorber 29 illustrated, although in other embodiments greater or lesser numbers could be employed. The annuli 38 are spaced from one another in the longitudinal direction of the cylinder-like shape by relatively rigid spacer bars 39. These are curved, essentially rectangular bars that extend parallel to the elongate direction of the cylinder-like shape. The spacer bars 39 preferably are made from the same material as the annuli 38 and indeed preferably are formed integrally with them during manufacture of the shock absorber 29.

The members of each adjacent pair of the annuli 38 are spaced in the illustrated embodiment by a pair of the spacer bars 39 that extend on opposite sides of the rings defined by the annuli 38. The members of each alternate pair of the annuli 38 are similarly spaced, except that the members of the pair of spacer bars 39 are rotated 90 degrees about the circumferences of the rings defined by the annuli 38 so as to be out of register with the spacer bars 39 of the next succeeding pair of the annuli 38. The result is a multiply perforated, hollow cylinder having the reticulated appearance shown.

The described offsetting of the pairs of spacer bars 39 connecting alternate pairs of the annuli 38 means that a force applied at one end of the shock absorber 29 is transmitted in a quasi-zigzag path from one end to the opposite end of the cylindrical shape. This in turn means that the spacer bars 39 spacing one pair of annuli 38 are not braced by aligned spacer bars 39 connecting the next adjacent pair of annuli 38. As a consequence on compression of the shock absorber 29 sufficiently to cause plastic deformation of the annuli 38 the spacer bars resist deformation of the annuli parts to which they are directly connected and permit it in the intermediate regions of the annuli 38. Therefore on compression each annulus 38 adopts the approximately sinusoidal outer edge shape visible in FIG. 2, in which shortening of the cylindrical shape as a result of the compression is also apparent.

It should be noted that other arrangements and numbers of the spacer bars 39 may be adopted within the scope of the invention. Thus, for example three or more spacer bars 39 may be used, with amounts of rotational offset varying from one embodiment of the invention to another.

Equally, the pattern of the spacer bars 39 may be irregular; the materials of the spacer bars 39 may not be the same as that of the annuli 38 or even each other; and the spacer bars 39 need not adopt the shapes illustrated.

Similarly, the annuli 38 may adopt other shapes than those shown and therefore need not be circular; and the parts of the shock absorber may for example be constructed from composites of materials in order to confer chosen energy absorption (or other) effects.

FIG. 1 shows the shock absorber 29 when located so as to encircle the mandrel 16 of the elongate toolstring 14 of FIGS. 3 to 5 described below. FIG. 1 also illustrates one form of spacer element 41 that is interposed between the shock absorber 29 and the mandrel 16 that is part of the elongate toolstring 14.

The spacer element 41 in the preferred embodiment is a perforated cylindrical bushing as is visible in FIG. 1. This is perforated by a central bore extending from one end of the bushing to the other, the diameter of the central bore being a sliding fit on the outer surface of the mandrel 16.

The interior of the cylindrical shape defined by the shock absorber 29 is a sliding fit on the external surface of the spacer element 41 with the result that the latter maintains the shock absorber 29 essentially concentric with the mandrel 16. This assists to ensure an even distribution of forces during impact force attenuation.

The spacer element 41 preferably is made from a plastics polymer such as a nylon, although a wide range of other materials is possible within the scope of the invention.

Plural numbers of the spacer elements 41 may be provided; and if desired these may adopt other shapes than the cylindrical one visible in FIG. 1. It moreover is not essential that each of a plurality of spacer elements 41 present in the logging toolstring assembly 10 is the same.

Figure 3:
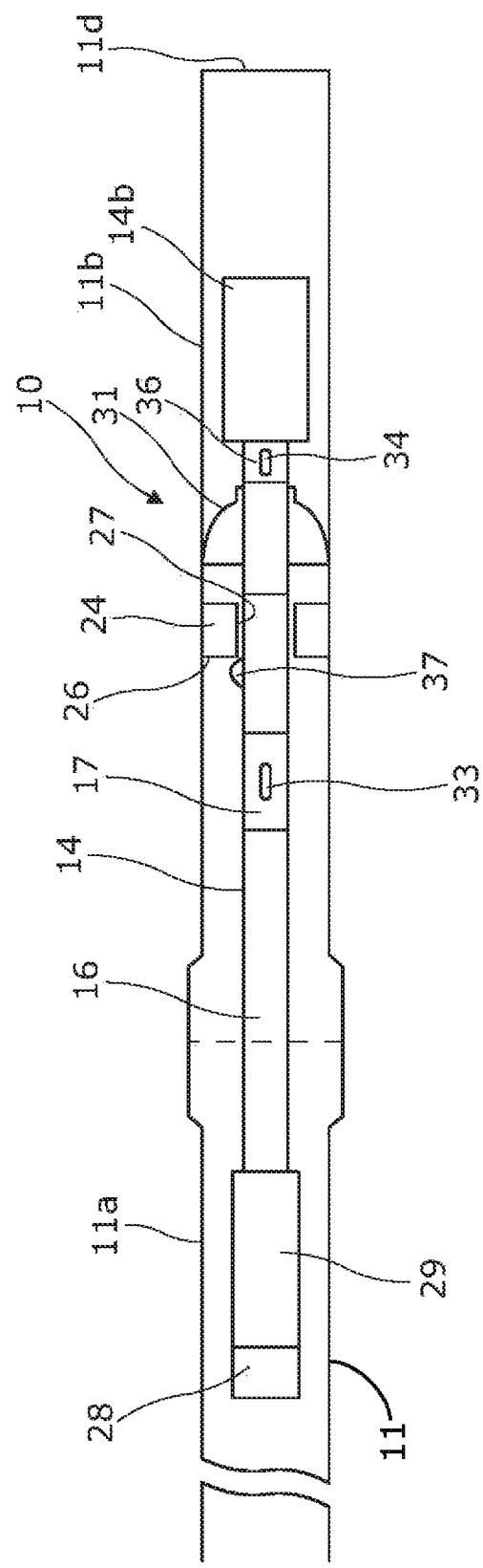
FIG. 3 is a schematic, longitudinal cross-sectional view of a simplified logging assembly that illustrates in broad terms the features and principles of the second and third aspects of the invention.

Referring to FIGS. 3 to 5, a logging assembly 10 comprises plural stands 11a, 11b of conventional drillpipe that are secured one to another in a seriate fashion by way of (also conventional) pin and box connection arrangements 12.

FIGS. 3 to 5 show only two stands 11a, 11b of drillpipe 11 connected together, but in practice the quantity of drillpipe 11 shown would represent part of the bottom hole assembly of a toolstring that once run in to a preferred location in a borehole or well might include many tens or hundreds of joints of drillpipe 11.

In FIGS. 3 to 5, the uphole end of the borehole or well is to the left of the images shown, and the downhole end to the right.

The logging assembly 10 of FIG. 3 includes an elongate toolstring 14 that in the configuration shown in FIG. 3 lies entirely within the drillpipe 11.

Toolstring 14 comprises a plurality of toolstring elements or subs that are secured in series one to another in a per se known manner.

The toolstring 14 is moveable longitudinally relative to the drillpipe between a retracted position as illustrated in FIG. 3 and an extended position in which the downhole end of the toolstring, constituted as a sonde 14b of a per se known type, protrudes in the downhole direction beyond the free end 11d of the drillpipe 11.

In its hollow interior, spaced from free end 11d, the drillpipe 11 includes a rigidly secured landing collar 24 or another device presenting a landing surface 26 that faces towards the uphole direction. The landing surface 26 has formed therein, or defines with e.g. the internal wall of the drillpipe 11, a through-going aperture 27 through which the logging toolstring 14 moveably (e.g. slidably) extends.

The assembly 10 includes a shock absorber 29 located at its uphole end. The shock absorber 29 preferably is of the kind described herein with reference to FIGS. 1 and 2, although it may be of a different design if desired. An essential characteristic of the shock absorber 29 is that it is capable of acting between the toolstring 14 and the landing surface 26 to attenuate impact energy on moving of the toolstring 14 from the retracted to the extended position.

It also is important that the shock absorber 29 prevents the logging toolstring 14 from passing entirely through the aperture 27, thereby causing its retention partly within the drillpipe 11 when deployed to the extended position.

To this end the toolstring 14 includes at its uphole end a protuberance that in the illustrated embodiment is a solid cylinder no-go 28 (although as described in relation to FIGS. 4 and 5 below other protuberance designs are possible).

The no-go 28 is rigidly fixed to the uphole end of the toolstring 14 and is positioned to bear against the uphole end of the shock absorber 29. Either the shock absorber 29 alone, or preferably the shock absorber 29 and the no-go 28, are too large on moving of the toolstring 14 to pass through aperture 27. As a result, the shock absorber 29 at such a time becomes crushed in an energy absorbing manner; and the toolstring 14 simultaneously is prevented from passing completely through the aperture 27.

The toolstring 14 includes an elongate rod or mandrel 16 the length of which exceeds that of the uncompressed shock absorber. This means that a substantial part of the movement of the toolstring 14 from the retracted to the extended position is undamped, with damping occurring as further described herein when the shock absorber 29 becomes compressed between the landing surface 26 and the no-go 28.

Downhole of the landing ring 24 the toolstring 14 includes an encircling seal member 31.

The purpose of the seal 31 is to provide an annular seal between the toolstring 14 and the interior wall of the drillpipe 11 so that fluid circulated under pressure in a well in which the assembly 10 is used may cause movement of the toolstring 14 from the illustrated, retracted position to its extended position. The seal 31 achieves this by blocking the flow of fluid between the exterior of the toolstring 14 and the drillpipe 11, except as occasioned (a) during movement of the toolstring as aforesaid and (b) selectively via an inflow sub 17 and an outflow sub to define a fluid bypass defined in part by a valve sub 36.

The inflow sub 17 includes an aperture 33 that communicates with the interior of a hollow portion of the toolstring 14. The hollow portion extends to the valve sub 36 where a further aperture 34, that is longitudinally spaced from aperture 33, opens at a location that is downhole of the seal 31.

The apertures 33, 34 and the interior of the hollow portion that connects them define a bypass path, for fluid, that bypasses the seal 31.

This bypass path is normally closed by a valve (not shown) that may be positioned at any convenient location along the bypass path (and in the described embodiment is in the sub 36).

The assembly also includes a latch shown schematically as a retractable member 37 that protrudes on the exterior of the toolstring uphole of the landing ring 24. The latch member 37 retains the toolstring 14 in the retracted position until its deployment is required.

At such a time (i.e. when the drillpipe 14 conveying the toolstring 14 has reached the logging depth in the well) the latch member 37 is released. In the illustrated embodiment, this takes the form of retraction of the latch member 37 into the body of the toolstring 14. This action may in turn be triggered in a number of ways, such as electronically or by the sending of a coded pulse of fluid.

At this time, the valve (not shown) in the bypass path is closed. Circulation of fluid in the well therefore causes fluid pressure to develop on the uphole side of the seal 31. As a result, the toolstring 14 is driven from the retracted to the extended position.

Towards the end of this motion, the shock absorber 29 engages the landing surface 26 and is crushed between surface 26 and no-go 28. This attenuates the impact energy that arises on landing of the uphole end of toolstring 14 on landing ring 24, thereby avoiding damage to all the downhole components other than the shock absorber 29 (which undergoes plastic deformation as described).

At this point, the valve (not shown) opens, opening the bypass fluid flow path described above. Fluid then flows via the inflow sub 17 via the apertures 33 and 34 thereby bypassing the seal 31 and permitting full circulation of the well while preserving the seal 31 against wear and damage.

The valve (not shown) may be of the type described below with reference to FIGS. 4 and 5, or it may be of another type as would be known to the person of skill in the art.

Thereafter, the drillpipe 11 may be withdrawn in an uphole direction while the sonde 14b is operated to log the formation in the vicinity of the borehole.

Referring now to FIGS. 4 and 5, another embodiment of assembly 10 according to the invention is shown in the retracted (FIG. 4) and extended (FIG. 5) conditions.

As in the case of FIG. 3, two stands or joints 11a, 11b of drillpipe 11 are shown connected to one another by way of a conventional connection arrangement 12.

The drillpipe stand 11b lying in use furthest from the surface location at which drillpipe 11 is added to the string during running in operations includes an in-use downhole part 11c formed in the embodiment shown as a conventional pin connection, although in other embodiments of the invention stand 11b could be modified at its downhole end to include a different type of connection arrangement.

This downhole part (i.e., pin connection) 11c is threadedly and securely received in a conventional box connection 13b of an elongate pipe 13a that is of larger internal diameter than that of the drillpipe 11. The elongate pipe 13a extends in a downhole direction beyond the end of the drillpipe 11.

In the embodiment illustrated, the elongate pipe 13a is formed as wash pipe the nature of which will be known to the person skilled in the art.

One characteristic of wash pipe is that its interior is a hollow circular monobore of greater diameter than drill pipe. As a result, the wash pipe is able to accommodate inside it larger tool elements than can be contained within the drillpipe 11.

The difference in diameter between the drillpipe 11 on the one hand and the wash pipe on the other is accommodated by flaring 13c of the latter in the vicinity of the box connection 13b.

Wash pipe in some respects is similar to drillpipe, being made from similar materials (e.g. case hardened steels) and being made in stands of approximately the same length as a stand of drillpipe. In the preferred embodiment of the logging toolstring assembly of the invention, a single stand of wash pipe is secured at the downhole end of the drillpipe 11, but in other embodiments of the invention longer or shorter lengths of wash pipe may if desired be employed.

Moreover, it is not necessary that the elongate pipe is formed as wash pipe, and instead it could take a range of other forms. However, the use of wash pipe is preferred for the reason that wash pipe is readily available in the oil and gas exploration industries, and is designed to pass relatively easily along openhole wells and bores.

The logging assembly 10 includes an elongate toolstring 14 one elongate part 14a of which lies inside and extends along the drillpipe and a further, connected elongate part 14b of which lies inside the elongate pipe 13 when the assembly 10 adopts the configuration shown in FIG. 4.

The elongate toolstring 14 includes a series of toolstring elements that are secured one to another in an end-to-end fashion. The part 14a of the toolstring is of relatively small diameter such as to fit easily inside the drillpipe 11 and consists chiefly of an elongate, rigid metal mandrel 16—the external diameter of which is somewhat less than the internal diameter of the drillpipe 11.

The part 14b of the toolstring 14 on the other hand includes a plurality of toolstring elements, especially one or more logging sondes and other logging toolstring elements or subs 17, 18, 19, 21, 22 at least one of which (and in practice typically more than one of which) has an exterior diameter or at least a transverse exterior dimension that exceeds the internal diameter of the drillpipe 11.

Such tool elements may include an eccentraliser or stabiliser 19 and an image logging sub 22 both of which as will be known to the person of skill in the art include protuberances as illustrated that are bigger than the aforesaid drillpipe internal diameter. Such elements by reason of their dimensions could not fit inside the drillpipe 11, but they can readily be accommodated, with a circumferential clearance, inside the elongate pipe 13—the internal diameter of which as stated is greater than that of the drillpipe. Numerous other types of sub may additionally or alternatively be present. It is optional but desirable that one or more of the subs is capable of performing logging operations.

The length of the elongate pipe 13 is chosen to be greater than the length of the part 14b of the elongate toolstring 14. In consequence, it is possible for the whole elongate toolstring 14 to be received inside the drillpipe 11 and the elongate pipe 13.

These relatively large toolstring elements 19, 22 are connected in the elongate toolstring 14 by way of conventional connector subs 18, 21 that, as is also known in the art, are used to connect the elements of a toolstring together in a mutually spaced manner.

The connector subs 18, 21 are cylinders of relatively small external diameter and would be capable of fitting inside the drillpipe 11; but once the elements 19 and 22 are connected in the toolstring, it becomes impossible for the part 14b of the elongate toolstring 14 to be housed inside the drillpipe 11.

The choice of subs (toolstring elements) making up the elongate toolstring 14 of the invention does not have to adopt the forms and combinations illustrated. On the contrary a great variety of combinations of subs is possible within the scope of the invention, and those in the representations are chosen purely to illustrate the inventive principles defined herein. The elongate toolstring 14 may, if desired in addition to subs devoted to the creation of log data, include e.g. a rotation preventer that prevents rotation of the parts of the sub relative to the drillpipe 11 and elongate pipe 13. Such components are known to be useful for certain kinds of data logging operation.

Because the part 14a of the elongate toolstring 14 fits with clearance inside the drillpipe 11 and the remainder 14b fits with clearance inside the elongate pipe 13, it is possible to effect relative movement between the elongate toolstring 14 and the drillpipe and elongate pipe combination 11, 13. As a result, it is possible to cause at least the part 14b of the toolstring 14, supporting the relatively large elements 19, 22, to move from a position in which the toolstring elements 18, 19, 21 and 22 lie inside the elongate pipe 13 to one in which they are extended to protrude beyond the downhole extent of the elongate pipe 13.

This configuration of the logging toolstring assembly is shown in FIG. 5, in which the toolstring elements 18, 19, 21 and 22 are exposed in open hole 23 protruding from the downhole end 13d of the elongate pipe (wash pipe) 13. In this configuration, by reason of the rigidity of the elongate toolstring 14 and the movement thereof as described, at least some of the part 14a thereof lies inside the elongate pipe 13.

The logging toolstring assembly 10 includes inside the drillpipe 11 or inside the elongate pipe 13, adjacent the box connection 13b, a landing ring represented schematically by numeral 24 and the position of which is fixed relative to the other parts of the logging toolstring assembly 10.

The landing ring 24 may take any of a range of forms and in the illustrated embodiment is shown as a rigid tube that is fixed relative to the drillpipe 11 and elongate pipe 13.

The landing ring 24 defines a landing surface 26 at its uphole end and also defines a through-going aperture 27 through which the mandrel 16 extends with sufficient clearance to permit movement of the part 14a relative to the aperture 27.

At its uphole end, part 14a of elongate toolstring 14 terminates in protuberance that in the embodiment shown is a solid cylinder 28 that is of larger external diameter than the remainder of toolstring part 14a and hence in like manner to the counterpart component in FIG. 3 may be referred to as a "no-go".

Cylinder 28 is rigidly secured on the in-use uphole end of the mandrel 16. The external diameter of cylinder 28 is such that it cannot pass through the aperture 27 and instead would become engaged with the landing surface 26 on movement of the elongate toolstring towards the extended position, but for the presence of a shock absorber 29 described above. The shock absorber 29 may be of the same design as the shock absorber 29 of FIG. 3, or it may be of a different design.

Shock absorber 29 is formed as an elongate cylinder that encircles the mandrel 16 and lies between the solid cylinder 28 and the landing ring 24. Shock absorber 29 is capable of undergoing plastic deformation as described below, and is of a diameter that does not pass through the aperture 27. As a result, on movement of the elongate toolstring to the extended position shown in FIG. 5, the downhole end of shock absorber 29 engages the landing surface 26 of landing ring 24 and becomes crushed between the solid cylinder 28 and the landing surface 26 to adopt a compressed form 29' as visible in FIG. 5. The shock absorber 29 therefore also has characteristics of a "no-go" in being too large to pass through the aperture 27.

As indicated, the shock absorber 29 is capable of undergoing plastic deformation, and the material and design of the shock absorber 29 are chosen to attenuate the energy of engagement of the downhole end of the shock absorber 29 with the landing surface 26. Thus, the shock absorber 29 is capable of acting between the elongate toolstring 14 and the landing surface 26 to attenuate impact energy arising on movement of the toolstring 14 to the extended position; and it is engageable with the landing surface 26 to limit movement of the toolstring 14 through the aperture 27 and thereby retain the toolstring 14 moveably captive relative to the drillpipe 11.

The protuberance at the uphole end of the mandrel 16 does not have to adopt the cylindrical shape shown and instead could be merely an anchor or reaction surface for the uphole end of the shock absorber 29, it being sufficient simply that the mandrel 16 is prevented from passing through or beyond the shock absorber 29 with the result that the uphole end on movement of the elongate toolstring 14 as described moves no further than the landing ring 24.

As an alternative to the inclusion of a protuberance at the uphole end of mandrel 16, the latter could, within the scope of the invention as broadly defined herein, include, for example, a recess into which part of the shock absorber projects in order to provide a reaction surface in the mandrel 16 promoting compression of the shock absorber 29 on landing of the shock absorber 29 on the landing surface 26.

Preferably, the shock absorber 29 is secured to the solid cylinder 28, but in other embodiments of the invention, the shock absorber 29 may be freely moveable on the mandrel 16 until compression of the shock absorber 29 initiates as described. The logging toolstring assembly 10 preferably includes one or more spacers that are described in more detail in relation to FIGS. 1 and 2 above, assuring even spacing of the shock absorber 29 around the circumference of the mandrel 16 when the shock absorber 29 is configured as a cylinder or part-cylinder as described below encircling the mandrel 16.

Furthermore, the shock absorber 29 while preferably embodied as a hollow cylinder encircling the mandrel 16 does not need to adopt this form. The shock absorber 29 therefore could be, for example, a partial cylinder that does not completely encircle the mandrel 16; or it could lie entirely externally of the mandrel 16 so as to extend parallel thereto. In cases in which the shock absorber 29 does not encircle the mandrel 16, it probably is more strongly desirable that the uphole end of the shock absorber 29 is secured to a protuberance at the location of the solid cylinder 28, in order to ensure that the shock absorber 29 is correctly aligned on contacting the landing surface 26.

Overall, however, the encircling cylindrical form of shock absorber 29 is preferred because it assures an even distribution of forces, thereby minimizing the risk of bending of the mandrel 16, and also minimizing the number of retention features needed in order to prevent the shock absorber 29 from separating from the mandrel 16.

Notwithstanding that the shock absorber 29 is compressible in order to dissipate the energy generated on landing of the uphole end of the elongate toolstring 14 on the landing surface 26 in the preferred embodiment of the invention shown in the representations, the mandrel 16 is of considerably greater length than the longitudinal dimension of the shock absorber 29. This means that the elongate toolstring 14 is capable of movement towards the extended position over a significant length before compression of the shock absorber 29 commences. This length is several multiples of the length of the shock absorber 29 in the preferred embodiment of the invention.

This in turn means that a part 14b of the elongate toolstring 14 approximately of the same length as the elongate pipe 13 can be accommodated inside the elongate pipe 13 and then caused to protrude therefrom.

At a location downhole of the landing ring 24 the logging toolstring 10 includes secured on its exterior a seal 31. This seal 31 in preferred embodiments of the invention takes the form of an annulus of resiliently deformable, reinforced material (such as a flexible polymer or rubber material or a rubber-aramid composite) that seals against the toolstring 14 at an inner aperture and the inner wall of the elongate pipe 13 at its outer periphery. An example of a suitable seal is illustrated schematically in FIG. 3.

The seal 31 is fixed to the toolstring 14 by any of a range of means familiar to the person of skill in the art so as to move with the toolstring 14 on movement of the latter between the retracted and extended positions. The seal 31 is such as to prevent the flow of fluid from the uphole side to the downhole side of the seal 31.

In the vicinity of the seal 31, the elongate toolstring 14 includes in series with the other parts thereof a sub 17 that is internally hollow by reason of the presence of a central, internal bore extending along the length of sub 17 and bounded by a toolstring wall 32.

Toolstring wall 32 is perforated by first and second fluid flow passages schematically signified by arrows 33, 34 at locations that lie respectively uphole and downhole of the seal 31. The passages 33, 34 communicate with the central bore of sub 17 and together therewith define a fluid flow path that is capable of bypassing the seal 31.

At least one of the first and second fluid passages 33, 34 includes therein a normally closed valve (not shown)—the position of which is represented by numeral 36 and that selectively blocks the flow of fluid via the internally hollow portion of sub 17. As a consequence, the bypassing fluid flow path is selectively openable and closeable.

One suitable form of valve, of many possible designs, is a plug that blocks the internally hollow portion. The plug is retained by one or more shear pins that rupture when the pressure of fluid in the internally hollow portion exceeds a threshold value. At this point, the plug is flushed by the fluid from the blocking position described, with the result that the bypass path opens.

The threshold pressure may be attained as a result of the rise in well fluid pressure that occurs on landing of the shock absorber as described, or for example through the transmission of an activation pulse.

The logging toolstring assembly 10 additionally includes a latch 37 shown in schematic form and located adjacent the landing ring 24. The latch 37 may be of a per se known design that secures the elongate toolstring 14 in its retracted position until it is required to deploy the toolstring. The latch 37 thus assures that the toolstring subs remain protected inside the elongate pipe 13 until it is time for logging operations to commence.

In use of the apparatus described, the logging toolstring assembly 10 is initially constructed in the configuration shown in FIG. 4, with the elongate toolstring 14 received entirely within the drillpipe 11 and elongate pipe 13. In this configuration, most of the mandrel 16 lies within the drillpipe 11, and the relatively large toolstring elements 19, 22 lie inside the elongate pipe 13. The latch 37 as noted retains the parts in this retracted configuration initially.

This assembly is run in to the borehole or well under investigation by a well-known process of adding stands of drillpipe one by one at the uphole end of the assembly in order to push the logging toolstring assembly 14 in a downhole direction. During this running in process, the entire elongate toolstring 14 is protected against damage and jamming in the well or borehole by reason of lying inside either the drillpipe 11 or the elongate pipe 13. This is a significant advantage because running in takes place relatively quickly so the risk of damage to exposed toolstring parts otherwise would be high.

The valve 36 is at this time closed so that the bypass fluid flow path is also closed.

When the elongate pipe 13 reaches the chosen depth in the well or borehole at which logging is to take place, further running in is stopped. The logging depth typically is a region of open hole 23 as shown in FIG. 2.

Following halting of the running in steps, the latch 37 is released as described, and fluid (e.g. drilling mud or another liquid substance) is pumped under pressure in a per se known manner in a downhole direction. The pressure of the fluid acts on the seal 31 and the uphole end of the elongate toolstring 14 to drive it in a downhole direction from the retracted position described herein to the extended position.

During this motion, the mandrel 16 moves through the aperture 27 in the landing ring 24 with the result that the subs 17, 18, 19, 21 and 22 become exposed beyond the downhole extent of the elongate pipe 13.

Towards the end of this process, the downhole end of the shock absorber 29 engages the landing surface 26 with the result that the shock absorber begins to compress and deform plastically, thereby attenuating and dissipating the impact energy that otherwise would be transmitted violently to the solid cylinder 28. As a consequence and despite the significant amounts of energy involved, the parts of the assembly 14 are maintained in a working condition.

The compression of the shock absorber 29 results in continued, albeit slowing, movement of the elongate assembly in a downhole direction until no further compression is possible, and the movement ceases. This causes opening of the valve 36 with the result that the fluid bypass flow path becomes open. In consequence, the fluid in the drillpipe 11 bypasses the seal 31 without any risk of pressure build-up causing damage to the parts of the assembly 14 that are uphole of the seal or to the seal itself. The fluid that bypasses the seal 31 then may be circulated up the outside of the drillpipe 11 to a surface location where it may as necessary undergo filtering and shaking before being returned to a fluid pit or other reservoir to await pumping back down the inside of the drillpipe 11.

The logging toolstring 14 at this stage is ready to commence logging operations. These occur through a process, as described, of removing the joints of drillpipe above the assembly one by one so as to withdraw the assembly 14 in an uphole direction. During this process the logging sonde(s) forming part of the exposed part 14b of the elongate toolstring log data about the formation surrounding the well or borehole. Such data may be recovered from the sonde(s) in various known ways and processed into logs.

In summary, therefore, the valuable parts of the logging tool as a result of the apparatus and method of the invention may be conveyed in a protected manner even though in the second embodiment of the invention some of them are too large to fit inside drillpipe.

Overall the apparatuses and methods of the invention provide for considerable improvements in various aspects of the conveyance of logging tools to subterranean locations. The preferred shock absorber 29 and the components of the logging toolstring 10 may be manufactured from rugged yet abundant materials and therefore may be produced relatively economically.

As used herein, "logging assembly" refers to an assembly of components intended for use downhole in a borehole or well for the purpose of logging a subterranean geological formation. Such an assembly includes as a subcomponent a logging toolstring, being a series of elongate elements that are secured to one another end to end for use in such a downhole environment. When employed for the purpose of logging a logging toolstring includes one or more sondes that are capable of carrying out logging method steps.

The terms "borehole", "bottom hole", "cased hole", "downhole", "drillpipe", "formation", "landing", "open hole", "sonde", "total depth", "uphole", "wash over", "wash pipe", "well" and "wellbore" used herein are familiar in the oil and gas exploration and completion industries. The person of skill in the art would understand these terms to have their conventional meanings.

Other terms of relevance to the invention are defined or explained herein as necessary.

The listing or discussion of an apparently prior-published document in this specification should not necessarily be taken as an acknowledgement that the document is part of the state of the art or is common general knowledge.

What is claimed is:

1. A downhole logging tool, comprising:
   a shock absorber disposed for downhole use on the downhole logging tool, the shock absorber comprising an elongate hollow member defined by a series of mutually aligned, plastically deformable annuli, each of the annuli being of similar dimensions to one another and having aligned perforations defining the hollowness of the elongate hollow member, whereby the elongate hollow member defines a hollow cylindrical shape, the annuli being spaced from one another in a direction of elongation by respective rigid spacer members secured to the annuli,
   wherein the annuli of the series are so spaced from one another by one or more of the spacer members such that, on compression of the shock absorber, the annuli deform plastically to a lesser extent in regions at which the spacer members are secured than at other regions, arrangement of the annuli and the spacer members causing compression to occur substantially parallel to a length of the shock absorber, and
   wherein at least two of the annuli adjacent one another in the series are spaced from one another by three or more of the spacer members that are disposed at equally spaced intervals about a circumference defined by the annuli.

2. The tool of claim 1, wherein the spacer members comprise spacer bars extending parallel to the length of the shock absorber.

3. The tool of claim 1,
wherein the spacer members comprise spacer bars extending parallel to the length of the shock absorber; and
wherein two of the annuli adjacent one another in the series are spaced from one another by first of the spacer bars disposed diametrically opposite one another with reference to the circumferences of the annuli.

4. The tool of claim 3, wherein two of the annuli adjacent one another and next in the series are so spaced from one another by second of the spacer bars, the second of the spacer bars being disposed diametrically opposite one another with reference to the circumferences of the annuli and being rotated by 90 degrees relative to the first of the spacer bars.

5. The tool of claim 1, wherein the annuli comprise a deformable metal.

6. The tool of claim 1, wherein the annuli and the spacer members are rigidly secured one to another.

7. The tool of claim 1, wherein the one or more spacer members spacing the annuli in the series are offset from one another such that the one or more spacer members spacing a given of the adjacent annuli are unbraced by the one or more spacer members spacing a next of the adjacent annuli in the series.

8. The tool of claim 7, wherein the arrangement of the annuli and the spacer members cause the compression applied at one end of the shock absorber to transmit in a quasi-zigzag path from the one end to an opposite end of the cylindrical shape.

9. The tool of claim 1, wherein a pattern of the spacer members is irregular or regular on the shock absorber.

10. A logging assembly, comprising:
a length of drillpipe defining an in-use downhole part;
an elongate toolstring supported by the drillpipe and comprising a plurality of toolstring elements secured seriate one to another, the toolstring being moveable longitudinally relative to the drillpipe between a retracted position lying within the drillpipe and an extended position partly protruding therefrom beyond the downhole extent thereof;
a landing surface inside the drillpipe, the landing surface having formed therein or defining an aperture through which part of the toolstring moveably extends; and
a shock absorber acting between the toolstring and the landing surface and attenuating impact energy arising on movement of the toolstring to the extended position, the shock absorber engageable with the landing surface and limiting movement of the toolstring through the aperture, thereby retaining the toolstring moveably captive relative to the drillpipe, the shock absorber comprising an elongate hollow member defined by a series of mutually aligned, plastically deformable annuli, each of the annuli being of similar dimensions to one another and having aligned perforations defining the hollowness of the elongate hollow member, whereby the elongate hollow member defines a hollow cylindrical shape, the annuli being spaced from one another in a direction of elongation by respective rigid spacer members secured to the annuli,
wherein the annuli of the series are so spaced from one another by one or more of the spacer members such that, on compression of the shock absorber, the annuli deform plastically to a lesser extent in regions at which the spacer members are secured than at other regions, arrangement of the annuli and the spacer members causing compression to occur substantially parallel to a length of the shock absorber, and
wherein at least two of the annuli adjacent one another in the series are spaced from one another by three or more of the spacer members that are disposed at equally spaced intervals about a circumference defined by the annuli.

11. The logging assembly of claim 10, wherein the toolstring comprises a protuberance secured to the toolstring and engageable by the shock absorber.

12. The logging assembly of claim 10, wherein the shock absorber is too large to pass through the aperture in or defined by the landing surface.

13. The logging assembly of claim 10, wherein the shock absorber comprises a compressible element that on compression dissipates impact or contact energy.

14. The logging assembly of claim 10, wherein the toolstring comprises an elongate bar or tube of greater length than a length of the shock absorber measured in a direction of elongation of the drillpipe, whereby the elongate bar or tube permits movement of the toolstring between the retracted and extended positions over a greater distance than the length of the shock absorber before attenuation of impact energy occurs.

15. The logging assembly of claim 10, wherein the toolstring comprises an elongate bar or tube of greater length than a length of the shock absorber measured in a direction of elongation of the drillpipe, whereby the elongate bar or tube permits movement of the toolstring between the retracted and extended positions over a greater distance than the length of the shock absorber before attenuation of impact energy occurs; and wherein the shock absorber defines a hollow cylinder encircling the elongate bar or tube.

16. The logging assembly of claim 10, wherein the toolstring comprises an elongate bar or tube of greater length than a length of the shock absorber measured in a direction of elongation of the drillpipe, whereby the elongate bar or tube permits movement of the toolstring between the retracted and extended positions over a greater distance than the length of the shock absorber before attenuation of impact energy occurs; wherein the shock absorber defines a hollow cylinder encircling the elongate bar or tube; and wherein the logging assembly comprises one or more spacer elements interposed between the hollow cylinder and the elongate toolstring.

17. The logging assembly of claim 10, further comprising a seal sealing between an exterior of the toolstring and an elongate pipe secured to the downhole part of the drillpipe, the seal prohibiting fluid flow on the exterior of the toolstring in the vicinity of the seal.

18. The logging assembly of claim 10, further comprising a seal sealing between an exterior of the toolstring and an elongate pipe secured to the downhole part of the drillpipe, the seal prohibiting fluid flow on the exterior of the toolstring in the vicinity of the seal; wherein the seal is fixed to the elongate toolstring and is moveable therewith.

19. The logging assembly of claim 10, further comprising a seal sealing between an exterior of the toolstring and an elongate pipe secured to the downhole part of the drillpipe, the seal prohibiting fluid flow on the exterior of the toolstring in the vicinity of the seal; wherein the seal is fixed to the elongate toolstring and is moveable therewith; and wherein the toolstring comprises a toolstring wall defining at least one internally hollow portion communicating with the exterior of the toolstring by way of longitudinally spaced first and second fluid passages perforating the toolstring wall, the first and second fluid passages together with the internally hollow portion defining a fluid flow path bypassing the seal.

20. The logging assembly of claim 10, wherein the toolstring comprises a toolstring wall defining at least one internally hollow portion communicating with an exterior of the toolstring by way of longitudinally spaced first and second fluid passages perforating the toolstring wall, the first and second fluid passages together with the internally hollow portion defining a fluid flow path bypassing a seal of at least one of the first and second passages of which comprises therein one or more valves selectively blocking flow of fluid via the internally hollow portion.

21. The logging assembly of claim 10, further comprising a latch acting between the toolstring and the drillpipe or an elongate pipe secured to the downhole part of the drillpipe, the latch selectively releasably retaining the toolstring in the retracted position.

22. The logging assembly of claim 10, wherein one or more of the toolstring elements comprises a logging sonde.

23. The logging assembly of claim 10, further comprising:
a length of elongate pipe of larger internal diameter than the drillpipe, the elongated pipe secured to the downhole part of the drillpipe and extending in a downhole direction beyond the drillpipe, and
wherein one or more of the toolstring elements are of greater external dimensions than an internal diameter of the drillpipe and lie within the elongate pipe when the toolstring occupies the retracted position, the one or more toolstring elements protruding beyond the elongate pipe when the toolstring occupies the extended position.

24. The logging assembly of claim 23, wherein the elongate pipe comprises wash pipe.

25. The logging assembly of claim 10, further comprising:
a length of elongate pipe of larger internal diameter than the drillpipe, the elongated pipe secured to the downhole part of the drillpipe and extending in a downhole direction beyond the drillpipe, and
wherein one or more of the toolstring elements are of greater external dimensions than the internal diameter of the drillpipe and lie within the elongate pipe when the toolstring occupies the retracted position, the one or more toolstring elements protruding beyond the elongate pipe when the toolstring occupies the extended position,
wherein at least one of the toolstring elements comprises a logging sonde.

26. The logging assembly of claim 10, wherein the elongate toolstring comprises a rotation lock preventing rotation of the toolstring relative to the drillpipe.

27. A logging method comprising:
providing a logging assembly according to claim 10 having the length of drillpipe, the elongate toolstring, and the shock absorber;
feeding the drillpipe in a downhole direction in a well or borehole with the toolstring in a retracted position;
halting downhole movement of the logging assembly; and
causing movement of the toolstring relative to the drillpipe to an extended position such that the shock absorber acts between the toolstring and the drillpipe to attenuate impact energy and such that part of the elongate toolstring protrudes beyond the drillpipe.

28. The method of claim 27, wherein:
the length of drillpipe defines an in-use downhole part;
the elongate toolstring is supported by the drillpipe and comprises a plurality of toolstring elements secured seriate one to another, the toolstring being moveable longitudinally relative to the drillpipe between the retracted position lying within the drillpipe and the extended position partly protruding therefrom beyond the downhole extent thereof,
the drillpipe having a landing surface inside, the landing surface having formed therein or defining an aperture through which part of the toolstring moveably extends; and
the shock absorber acts between the toolstring and the landing surface and attenuates impact energy arising on movement of the toolstring to the extended position, the shock absorber engageable with the landing surface and limiting movement of the toolstring through the aperture, thereby retaining the toolstring moveably captive relative to the drillpipe.

29. The method of claim 27, wherein the logging assembly comprises:
a length of elongate pipe of larger internal diameter than the drillpipe, the elongate pipe secured to a downhole part of the drillpipe and extending in a downhole direction beyond the drillpipe, and
one or more toolstring elements of the elongate toolstring being of greater external dimensions than an internal diameter of the drillpipe and lying within the elongate pipe when the toolstring occupies the retracted position, the one or more toolstring elements protruding beyond the elongate pipe when the toolstring occupies an extended position;
wherein at least one of the toolstring elements comprises a logging sonde; and
wherein the step of causing movement of one or more of the toolstring elements causes them to protrude from the elongate pipe beyond the downhole extent thereof.

30. The method of claim 27, wherein the toolstring comprises:
a toolstring wall defining at least one internally hollow portion communicating with an exterior of the toolstring by way of longitudinally spaced first and second fluid passages perforating the toolstring wall, the first and second fluid passages together with the internally hollow portion defining a fluid flow path bypassing a seal of at least one of the first and second passages of which comprises therein one or more valves selectively blocking flow of fluid via the internally hollow portion,
wherein the step of causing movement of the toolstring comprises:
closing or maintaining closed the one or more valves in order to close the fluid flow path bypassing the seal; and
circulating the well or borehole with fluid having a pressure acting on the toolstring to drive it in a downhole direction.

31. The method of claim 27, further comprising latching the toolstring in the retracted position.

32. The method of claim 27,
wherein the elongate toolstring comprises a rotation lock preventing rotation of the toolstring relative to the drillpipe, and
wherein the method further comprises the step of operating the rotation lock to prevent or limit rotation of the toolstring relative to the drillpipe.

33. The method of claim 27, further comprising withdrawing the logging assembly towards a surface location.

34. The method of claim 33, further comprising operating at least one logging sonde to log a formation during withdrawal of the logging assembly.

35. The method of claim 27, further comprising compressing the shock absorber so as to cause plastic deformation of at least a part of it.

* * * * *